United States Patent
Chu et al.

(10) Patent No.: US 8,983,089 B1
(45) Date of Patent: Mar. 17, 2015

(54) SOUND SOURCE LOCALIZATION USING MULTIPLE MICROPHONE ARRAYS

(75) Inventors: Wai C. Chu, San Jose, CA (US); Edward Dietz Crump, Santa Cruz, CA (US)

(73) Assignee: Rawles LLC, Wilmington, DE (US)

( * ) Notice: Subject to any disclaimer, the term of this patent is extended or adjusted under 35 U.S.C. 154(b) by 575 days.

(21) Appl. No.: 13/305,189

(22) Filed: Nov. 28, 2011

(51) Int. Cl.
*H04R 3/00* (2006.01)
*H04R 29/00* (2006.01)

(52) U.S. Cl.
USPC ............................................. 381/92; 381/58

(58) Field of Classification Search
CPC .. H04R 3/005; H04R 1/406; H04R 2201/401; G10L 2021/02166
USPC .............. 381/92, 58, 71.1, 19, 23; 455/456.1, 455/563; 348/14.08, 14.01, 14.11; 700/94, 700/258
See application file for complete search history.

(56) References Cited

U.S. PATENT DOCUMENTS

| 7,418,392 | B1 | 8/2008 | Mozer et al. |
| 7,720,683 | B1 | 5/2010 | Vermeulen et al. |
| 7,774,204 | B2 | 8/2010 | Mozer et al. |
| 8,155,331 | B2 * | 4/2012 | Nakadai et al. ................. 381/58 |
| 8,510,110 | B2 * | 8/2013 | Zhang et al. ................... 704/246 |
| 2004/0175006 | A1 * | 9/2004 | Kim et al. ........................ 381/92 |
| 2011/0002469 | A1 * | 1/2011 | Ojala ............................... 381/22 |
| 2012/0076316 | A1 * | 3/2012 | Zhu et al. ................... 381/71.11 |
| 2012/0223885 | A1 | 9/2012 | Perez |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Vivian Chin
*Assistant Examiner* — Ammar Hamid
(74) *Attorney, Agent, or Firm* — Lee & Hayes, PLLC

(57) ABSTRACT

An augmented reality environment allows interaction between virtual and real objects. Multiple microphone arrays of different physical sizes are used to acquire signals for spatial tracking of one or more sound sources within the environment. A first array with a larger size may be used to track an object beyond a threshold distance, while a second array having a size smaller than the first may be used to track the object up to the threshold distance. By selecting different sized arrays, accuracy of the spatial location is improved.

24 Claims, 10 Drawing Sheets

SOUND SOURCE LOCALIZATION USING MULTIPLE MICROPHONE ARRAYS

BACKGROUND

Accurate determination of a position of a sound within a space, also known as localization, may be used in many applications. These applications may include augmented reality environments which allow users and other real-world objects to interact with virtual or computer-generated objects and information.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
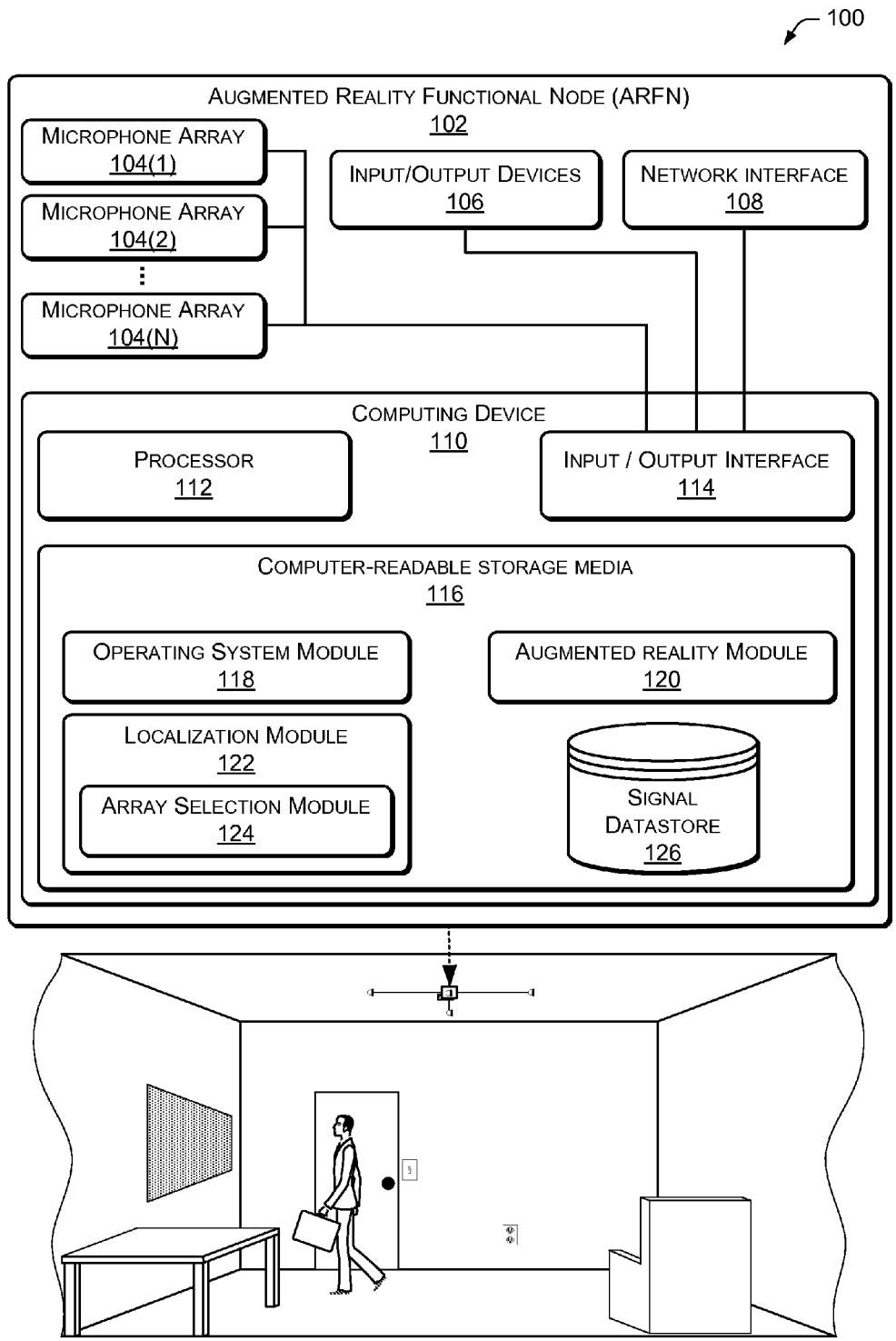
FIG. 1 shows an illustrative scene within an augmented reality environment which includes an augmented reality functional node and an associated computing device with multiple microphone arrays and a localization module.

Sound source localization is the process of determining from where in a particular space a sound originates, such as by determining a bearing and a distance relative to an origin. Sound sources include user speech, audible gestures, audio signaling devices, musical instruments, audio playback devices, mechanical systems, and so forth. The sound sources may include frequencies generally audible to the humans' ears or inaudible to the humans' ears, such as ultrasound.

Localization is used in a variety of applications including quality control, equipment maintenance, user input in augmented reality environments, and so forth. Knowledge of a spatial position of a sound source may be used in a variety of ways including to identify a user or object, adjusted projected images in an augmented reality environment, select beam patterns to improve signal recovery, and so forth. Traditional systems have used a single array of microphones to localize a source of the sound. However, single arrays suffer from the disadvantage of introducing uncertainty or error in bearing and distance measurements depending upon factors such as the distance of the object from the origin. For example, a single large array may provide localization with a suitable level of accuracy when the sound source is distant from the array, but may provide erroneous results when the sound source is close to the array.

Described herein are devices incorporating two or more microphone arrays of differing sizes. Each microphone array contains a plurality of microphones configured to generate signal data in response to sound. The microphones in the array may be distributed in regular or irregular linear, planar, or three-dimensional arrangements. Also described are techniques for using data from the microphones in these arrays to localize the sound source. One of the two or more arrays may be selected based on a specified threshold. In some implementations this threshold may comprise a distance. For example, sound sources beyond a threshold distance value are localized using data from a large array while sound sources under the threshold distance are localized using data from a small array.

The threshold may be determined by comparing localization results based on data from the different arrays with location information gathered using other sensors. The system may then be configured to use the array which provides more accurate results for a particular set of conditions, such as distance and bearing to the sound source. For example, a spatial position of the sound source may be determined in the physical environment by various techniques including structured light, image capture, manual entry, and so forth. Structured light may involve projection of a pattern onto objects within a scene and may determine position based upon sensing the interaction of the objects with the pattern using an imaging device. The pattern may be regular, random, pseudo-random, and so forth. For example, a structured light system may determine a user's face is at particular coordinates within in the room.

A spatial position of the sound source may be identified in a planar manner, such as with reference to an azimuth, or in a three-dimensional manner, such as with reference to an azimuth and an elevation. In some implementations the signal source may be localized with reference to a particular set of coordinates, such as azimuth, elevation, and distance from a known reference point, such as a defined pole or origin of the system.

Illustrative Environment

FIG. 1 shows an illustrative augmented reality environment 100 with an augmented reality functional node (ARFN) 102 having an associated computing device. In some implementations, additional ARFNs 102(1), 102(2), . . . , 102(N) may be used. The ARFN 102 may be positioned in the physical environment, such as in the corners or center of the ceiling, on a tabletop, on a floor stand, and so forth. When active, one such ARFN 102 may generate an augmented reality environment incorporating some or all of the items in the scene such as real-world objects.

A plurality of microphone arrays 104(1), 104(2), 104(3), . . . 104(N), input/output devices 106, network interface 108, and so forth may couple to a computing device 110 containing a processor 112 via an input/output interface 114. Each of the microphone arrays 104 comprise a plurality of microphones. In some implementations one or more microphones may be shared between arrays. The microphones may be distributed in regular or irregular pattern. The pattern may be linear, planar, or three-dimensional. Microphones within the array may have different sensitivities, frequency responses, patterns, and so forth. Various microphone arrays are discussed in more detail below with regards to FIGS. 3-7. The use of the microphone arrays and localization techniques as described herein with regards to augmented reality are for illustrative purposes only, and are not to be construed as a limitation.

The ARFN 102 may incorporate or couple to input/output devices 106. These input/output devices include projectors, cameras, microphones, other ARFNs 102, other computing devices 110, and so forth. The coupling between the computing device 110 and the input/output devices 106 may be via wire, fiber optic cable, or wireless connection. Some of the input/output devices 106 of the ARFN 102 are described below in more detail with regards to FIG. 2.

The network interface 108 is configured to couple the computing device 110 to a network such as a local area network, wide area network, wireless wide area network, and so forth. The network interface 108 may be used to transfer data between the computing device 110 and other devices such as other computing devices 110, and cloud resources via the internet. For example, data from the microphone arrays 104 may be sent to a cloud resource such as a server for processing.

The processor 112 may comprise one or more processors configured to execute instructions. The instructions may be stored in computer-readable storage media ("CRSM") 116, or in other memory accessible to the processor 112 such as in the cloud via the network interface 108.

The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the CRSM 116 and configured to execute on a processor, such as the processor 112. An operating system module 118 is configured to manage hardware and services within and coupled to the computing device 110 for the benefit of other modules. An augmented reality module 120 is configured to maintain the augmented reality environment.

A localization module 122 is configured to determine a location or direction of a sound source relative to the microphone arrays 104 based on data from the microphones in the arrays. The localization module 122 may use a variety of techniques including trilateration, time-difference-of-arrival, and so forth. Various time-difference-of-arrival techniques may be utilized. These include the VMRL technique described by Jean-Marc Valin, Francois Michaud, Jean Rouat, Dominic Letourneau as well as the linear intersection estimator also known as the BAS technique by Michael S. Brandstein, John E. Adcock, and Harvey F. Silverman.

An array selection module 124 may be used by the localization module 122 to select which of the microphone arrays 104 to use data from in the localization process. For example, the array selection module 124 may be configured to use one array rather than another based at least in part on a distance to the object. This implementation is discussed below in more detail with regards to FIG. 8.

In some implementations, the localization module 122 may utilize, at least in part, data including structured light, ranging data, and so forth as acquired via the input/output device 106 to determine a location of the sound source. For example, a structured light projector and camera may be used to determine the physical location of the user's head, from which sound signals may emanate.

In some implementations the signal data from the microphone arrays 104 and/or other input devices in the augmented reality environment may be stored in a signal datastore 128. For example, data acquired from the different microphone arrays 104 may be stored for later processing.

Modules may be stored in the CRSM of the ARFN 102, storage devices accessible on the local network, or cloud storage accessible the network interface 108. For example, the localization module 122 may be stored and executed within a cloud resource using data acquired by the microphone arrays 104.

Figure 2:
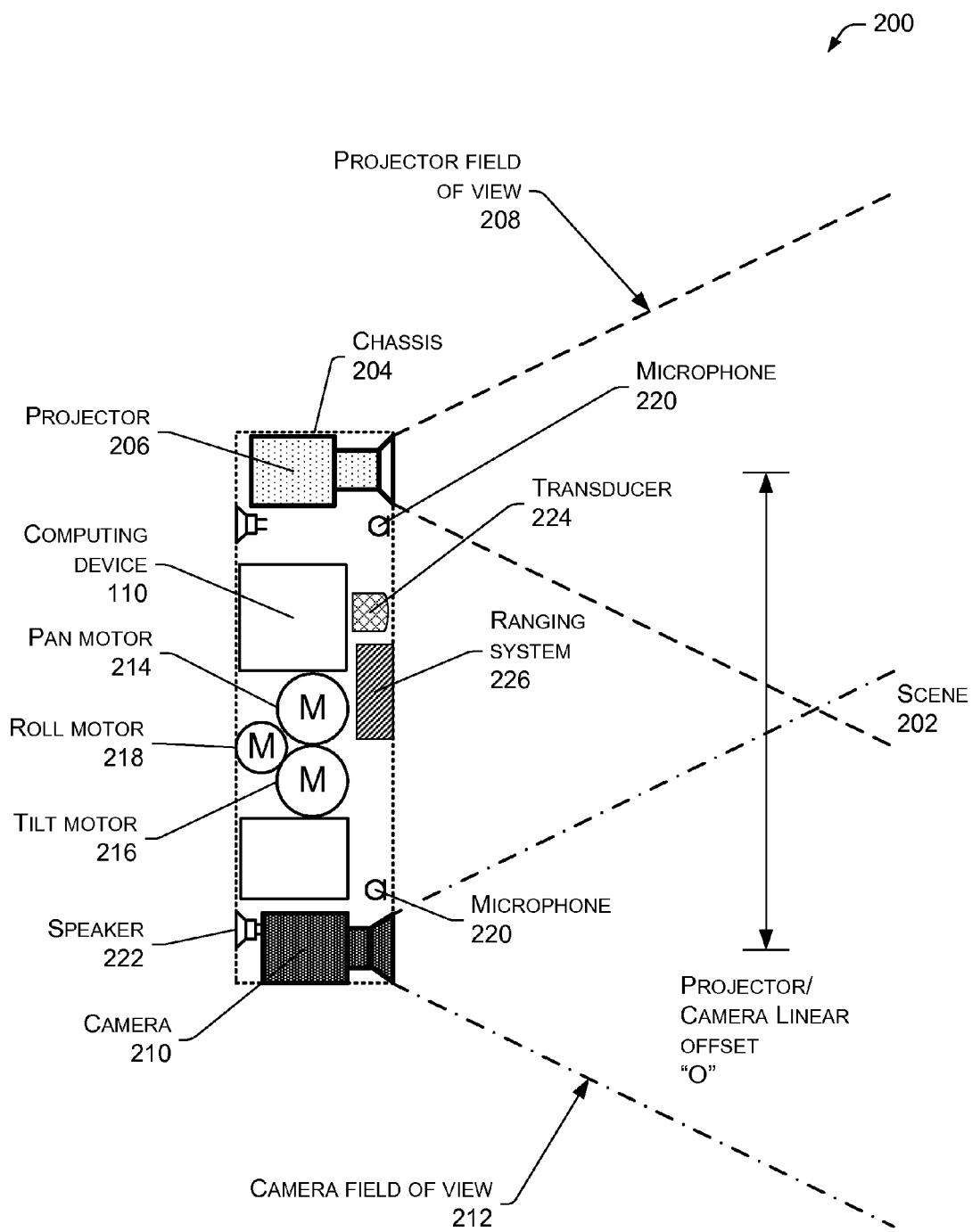
FIG. 2 shows an illustrative augmented reality functional node.

FIG. 2 shows an illustrative schematic 200 of one example of a portion of an augmented reality functional node 102 and selected components including input/output devices 106. The ARFN 102 is configured to scan at least a portion of a scene 202 and the objects therein. The ARFN 102 may also be configured to provide augmented reality output, such as images, sounds, and so forth.

A chassis 204 holds the components of at least a portion of the ARFN 102. Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, a plurality of projectors 206 may be used.

A camera 210 may also be disposed within the chassis 204. The camera 210 is configured to image the scene in visible light wavelengths, non-visible light wavelengths, or both. The camera 210 has a camera field of view 212 which describes a particular solid angle. The camera field of view 212 may vary according to changes in the configuration of the camera 210. For example, an optical zoom of the camera may narrow the camera field of view 212. In some implementations, a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation the actuator may comprise a pan motor 214, tilt motor 216, a roll motor 218, and so forth. The pan motor 214 is configured to rotate the chassis 204 in a yawing motion changing the azimuth. The tilt motor 216 is configured to change the pitch of the chassis 204 changing the elevation. The roll motor 218 is configured to rotate the chassis 204 in a rolling motion. By panning, tilting, and/or rolling the chassis 204, different views of the scene may be acquired.

One or more microphones 220 may be disposed within the chassis 204, or elsewhere within the scene such in the microphone arrays 104. In some implementations, the microphone array 104 may include the one or more microphones 220 within the chassis 204. These microphones 220 may be used to acquire input from the user, for echolocation, location determination of a sound, or to otherwise aid in the characterization of and receipt of input from the scene. For example, the user may make a particular noise, such as a tap on a wall or snap of the fingers in a particular location, which are pre-designated as inputs. The user may alternatively use voice commands.

One or more speakers 222 may also be present to provide for audible output. For example, the speakers 222 may be used to provide output from a text-to-speech module or to playback pre-recorded audio.

A transducer 224 may be present within the ARFN 102, or elsewhere within the environment, and configured to detect and/or generate inaudible signals, such as infrasound or ultrasound. These inaudible signals may be used to provide for signaling between accessory devices and the ARFN 102.

A ranging system 226 may also be provided in the ARFN 102. The ranging system 226 may be configured to provide distance, location, or distance and location information from the ARFN 102 to a scanned object or set of objects. The ranging system 226 may comprise radar, light detection and ranging (LIDAR), ultrasonic ranging, stereoscopic ranging, and so forth. The ranging system 226 may also provide direction information in some implementations. The transducer 224, the microphones 220, the speaker 222, or a combination thereof may be configured to use echolocation or echo-ranging to determine distance and spatial characteristics.

In another implementation, the ranging system 226 may comprise an acoustic transducer and the microphones 220 may be configured to detect a signal generated by the acoustic transducer. For example, a set of ultrasonic transducers may be disposed such that each projects ultrasonic sound into a particular sector of the room. The microphones 220 may be configured to receive the ultrasonic signals, or dedicated ultrasonic microphones may be used. Given the known location of the microphones relative to one another, active sonar ranging and positioning may be provided.

In this illustration, the computing device 110 is shown within the chassis 204. However, in other implementations all or a portion of the computing device 110 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via the network interface 108 and a local area network, cloud resources accessible via a wide area network connection, or a combination thereof.

Also shown in this illustration is a projector/camera linear offset designated "O". This is a linear distance between the projector 206 and the camera 210. Placement of the projector 206 and the camera 210 at distance "O" from one another aids in the recovery of structured light data from the scene. The known projector/camera linear offset "O" may also be used to calculate distances, dimensioning, and otherwise aid in the characterization of objects within the scene 202. In other implementations the relative angle and size of the projector field of view 208 and camera field of view 212 may vary. Also, the angle of the projector 206 and the camera 210 relative to the chassis 204 may vary.

In other implementations, the components of the ARFN 102 may be distributed in one or more locations within the environment 100. As mentioned above, the microphones 220 and the speakers 222 may be distributed throughout the scene. The projector 206 and the camera 210 may also be located in separate chassis 204. The ARFN 102 may also include discrete portable signaling devices used by users to issue command attention inputs. For example, these may be acoustic clickers (audible or ultrasonic), electronic signaling devices such as infrared emitters, radio transmitters, and so forth.

Figure 3:
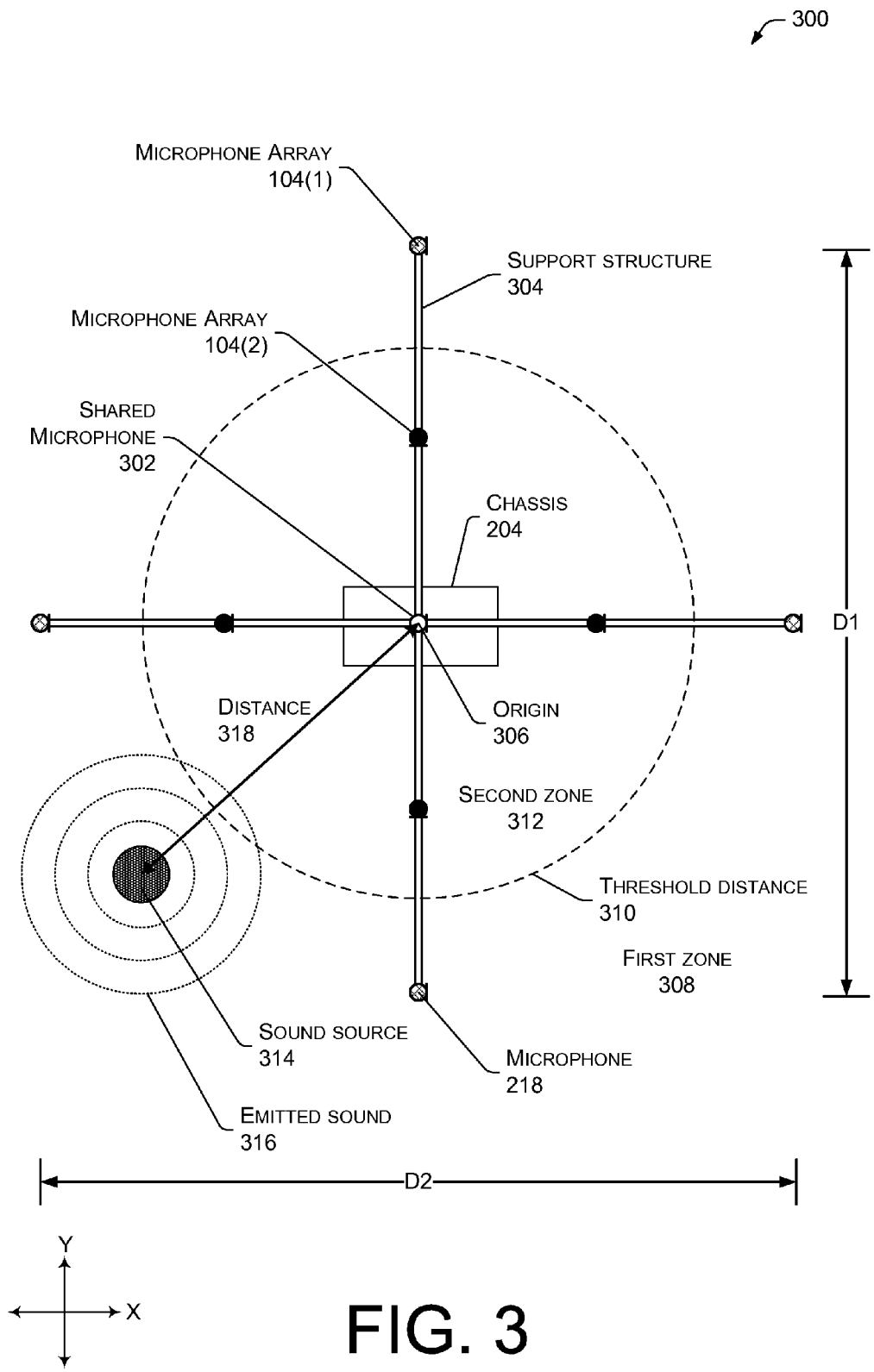
FIG. 3 shows an overhead view of two microphone arrays.
Figure 4:
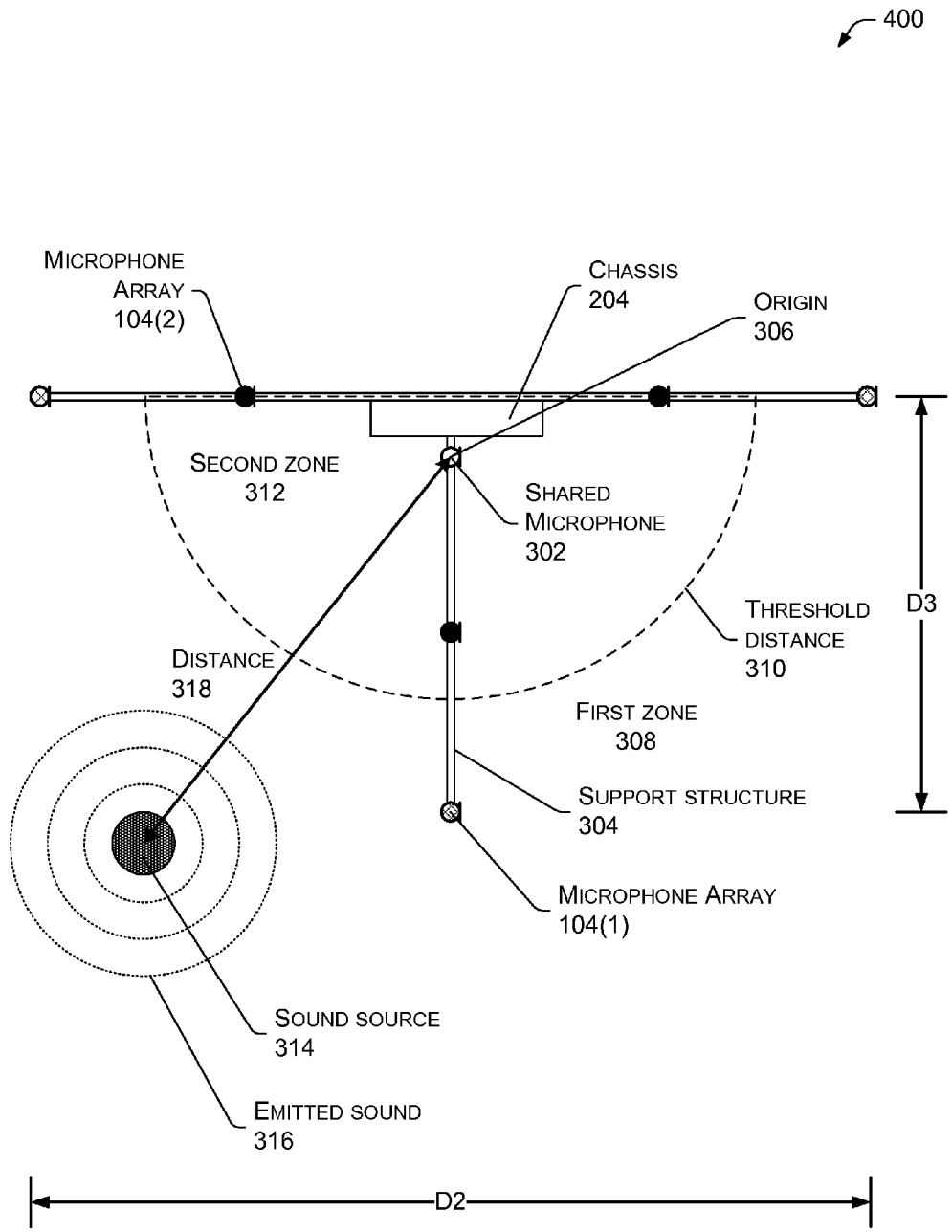
FIG. 4 shows a side view of the microphone arrays of FIG. 3.

FIG. 3 shows an overhead view 300 of one implementation of the microphone arrays 104 in an augmented reality functional node 102. In this illustration a shared microphone 302 which his used in a first microphone array 104(1) and a second microphone array 104(2) is coupled to a support structure 304. In this and the remaining figures, shared microphones are indicated with a solid white fill. The support structure 304 describes a cross with two linear members disposed perpendicular to one another each having length of D1 and D2 and an orthogonal member as shown in FIG. 4 below. The support structure 304 aids in maintaining a known pre-determined distance between the microphones 220 which may then be used in the localization of the sound signal.

Microphones 220(1)-(M) are distributed along the support structure 304, and may be designated into two or more arrays. The first microphone array 104(1) shown here extends around a perimeter of the support structure at the ends of the linear members and includes the shared microphone 302 at the intersection of the linear members. The second microphone array 104(2) comprises the shared microphone 302 and four microphones 220 disposed between the shared microphone 302 and the microphones of the first array 104(1). The distribution of the microphones 220 within each of the arrays 104 may be symmetrical or asymmetrical. It is understood that the number and placement of the microphones 220 as well as the shape of the support structure 304 may vary. For example, in other implementations the support structure may describe a triangular, circular, or other geometric shape. In some implementations an asymmetrical support structure shape, distribution of microphones, or both may be used. The first microphone array 104(1) encompasses a first area while the second microphone array 104(2) encompasses a second area which is smaller than the first area. These areas may be adjacent, overlap, or be exclusive of one another.

A pole or origin 306 is a designated point among the arrays 104 from which a bearing and distance of the sound source is determined. The origin 306 may be coincident with a microphone, portion of the support structure 304, or a point in space.

A first zone 308 may be designated extending outwards from a threshold distance 310, relative to the origin 306. A second zone 312 extends from the origin 306 to the threshold distance 310. The second zone 312 is depicted here as being circular. However, in other implementations the second zone 312 may be other symmetric or asymmetric shapes.

A sound source 314 is shown here within the first zone 308, at a distance 318 from the origin 306 which is outside the threshold distance 310. The sound source 316 is shown producing emitted sound 316, which is detected by the microphones 220 in the arrays 104. For example, the sound source may comprise a person talking, an acoustic signaling device, and so forth.

For sound sources 314 within the first zone 308, the first microphone array 104(1) may be selected by the array selection module 124. Data from the first microphone array 104(1) then provides data for the localization module 122 to determine the spatial location of the sound source 314.

When the sound source 314 is within the threshold distance 310, and thus inside the second zone 312, the second microphone array 104(2) may be selected by the array selection module 124. As above, once selected, the second microphone array 104(2) provides data for the localization module 122 to determine the spatial location of the sound source 314.

In some implementations, one or more characteristics such as frequency response, sensitivity, and so forth may vary between the microphones 220 in the first microphone array 104(1) and those in the second microphone array 104(2). For example, the first microphone array 104(1) may be configured to be more sensitive to sounds below 1 kHz while the second microphone array 104(2) may be configured be more sensitive to sounds above 3 kHz.

The support structure 304 may comprise part of the structure of a room. For example, the microphones 220 may be mounted to the walls, ceilings, floor, and so forth within the room. In some implementations the microphones 220 may be emplaced, and their position relative to one another determined through other sensing means, such as via the ranging system 226, structured light scan, manual entry, and so forth. For example, in one implementation the microphones 220 may be placed at various locations within the room and their precise position relative to one another determined by the ranging system 226 using an optical range finder configured to detect an optical tag disposed upon each.

While two microphone arrays are shown, it is understood that more microphone arrays may be present. For example, a third microphone array may encompass an area larger than the first microphone array 104(1). Or in another implementation the third microphone array may be smaller than the second microphone array 104(2).

FIG. 4 shows a side view 400 of the microphone arrays of FIG. 3. As shown here, the microphone arrays 104 may be configured with the microphones 220 disposed in a three-dimensional arrangement. As shown here, a portion of the support structure 304 is configured to be orthogonal to the other members of the support structure 304. The support structure 304 extends a distance D3 from the chassis 204. By arranging the microphones 220 in a three-dimensional configuration, the localization module 122 is able to more precisely locate the sound source 314 in space. As above, the first zone 308 may be designated extending from the threshold distance 310 from the origin 306 outwards. The second zone 312 extends from the origin 306 to the threshold distance 310. The second zone 312 as depicted here and in FIG. 3 describes a hemispherical volume. However, in other implementations the second zone 312 may be other symmetric or asymmetric shapes.

In one implementation the microphones 220 and microphone arrays 104 are configured to operate in a non-aqueous and gaseous medium having a density of less than about 100 kilograms per cubic meter. For example, the microphone arrays 104 are configured to acquire audio signals in a standard atmosphere.

Figure 5:
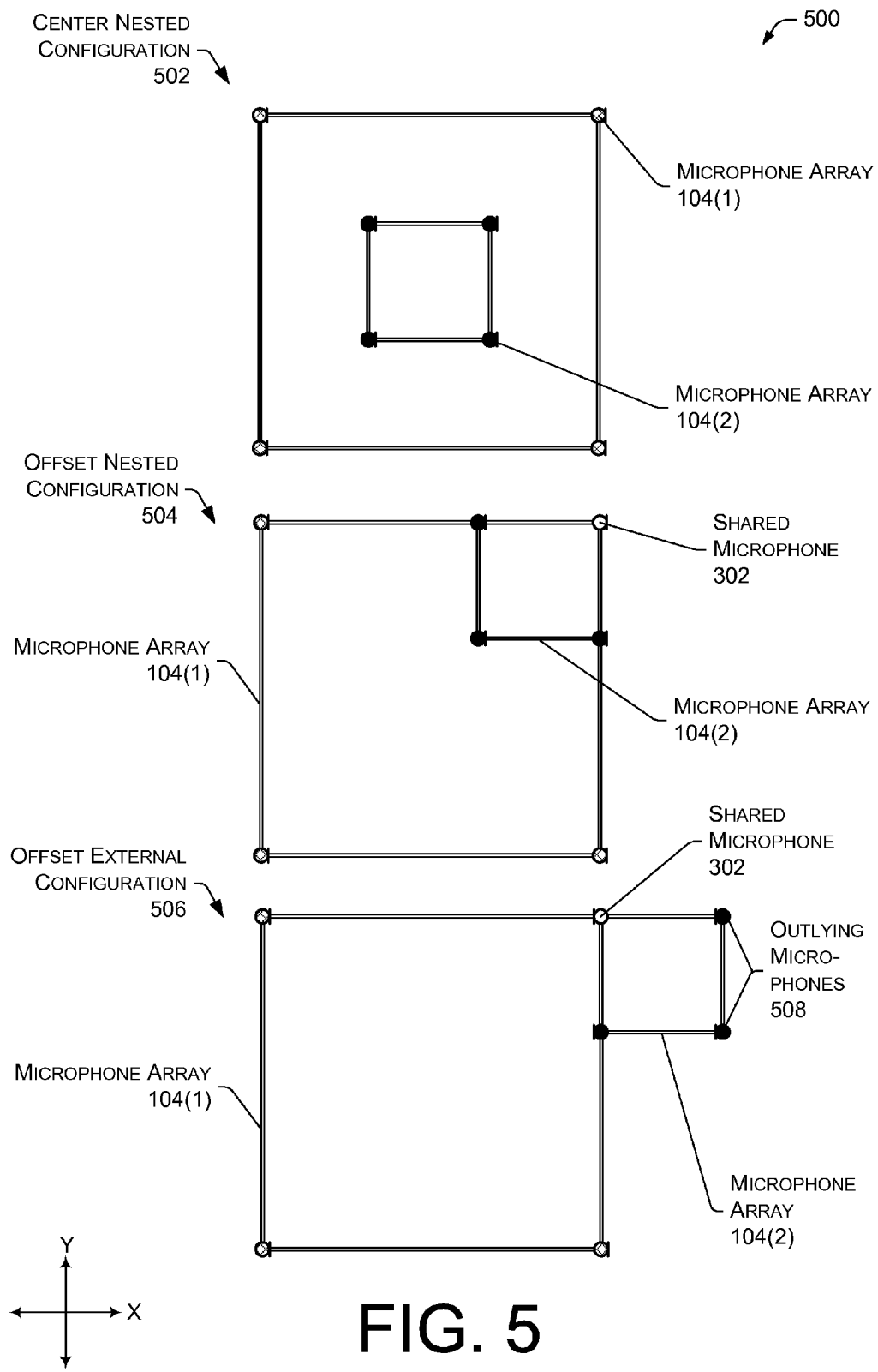
FIG. 5 illustrates various microphone array configurations incorporating a first and a second array.

FIG. 5 illustrates various microphone array configurations 500 incorporating a first and a second array. While the following configurations depict microphones arranged in rectilinear arrays, it is understood that other configurations are possible. For example, the array may describe regular or irregular polygons having three or more sides. Furthermore, the polygons described by the first and second microphone arrays need not be the same. For example, the first microphone array 104(1) may describe a nonagon while the second microphone array 104(2) may describe a hexagon.

At 502, a center-nested configuration is depicted. In this configuration the second microphone array 104(2) is positioned within the center of the first microphone array 104(1).

At 504, an offset nested configuration 504 is depicted where the second microphone array 104(2) is disposed at a position other than the center, but within a perimeter described by the first microphone array 104(1). In some implementations, such as shown here, at least one microphone 302 is shared between the first microphone array 104(1) and the second microphone array 104(2). Sharing one or more microphones between arrays may provide several benefits including reducing costs by reducing overall microphone count, simplifying processing by providing a set of signals used by both arrays with common timing (as they originated at the same microphone), and so forth.

In some implementations an offset external configuration 506 may be used. In this configuration, the second microphone array 104(2) is disposed such that at least a portion of the microphones in the second microphone array 104(2) are at least partly outside of the perimeter formed by the first microphone array 104. In another implementation, the second microphone array 104(2) may be configured with a different set of microphones 220, such that no microphone is shared between the arrays. The first microphone array 104(1) and the second microphone array 104(2) may also partially overlap one another in some implementations.

In some implementations, at least a portion of the first microphone array 104(1), the second microphone array 104(2), or both may be configured to physically move. For example, outlying microphones 508 which are disposed outside of the perimeter of the first microphone array 104(1) may be configured to move between the position shown which is outside the perimeter and a position inside the perimeter. Thus, the configuration may switch between the offset external configuration 506 and one of the other configurations such as the offset nested configuration 504.

Figure 6:
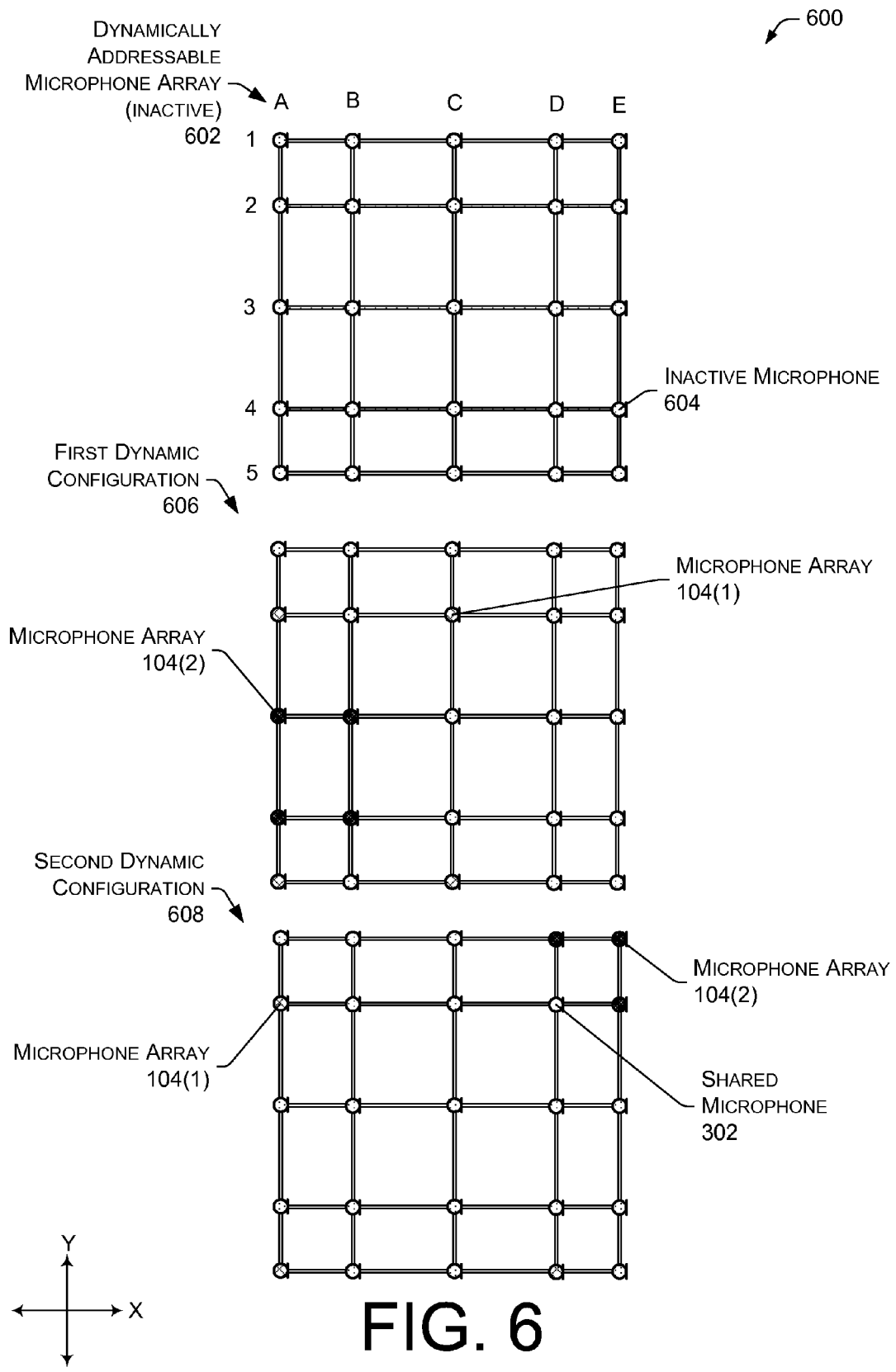
FIG. 6 illustrates a dynamically addressable microphone array configured to form at least two microphone arrays.

FIG. 6 illustrates a dynamically addressable microphone 600 array configured to form at least two microphone arrays. The dynamically addressable microphone array 600 is depicted here as a grid, but in other implementations other arrangements may be used, such as a hexagonal arrangement, or non-periodic arrangement such as a Penrose tiling. In this illustration, the grid is intentionally irregular such that squares within the grid are non-uniform. However, in some implementations a regular grid having substantially the same grid spacing may be used.

The microphones 220 within the dynamically addressable microphone array 600 are configured such that data from each microphone may be acquired and analyzed discretely. By varying which of the microphones acquire data (such as by turning them on or off), or by varying what data from particular microphones is analyzed, microphone arrays of different sizes and shapes may be formed. These different sizes and shapes may be selected to improve localization performance.

For ease of reference and not by way of limitation, the dynamically addressable microphone array 600 is described in terms of column headings A, B, C, D, and E and row headings of 1, 2, 3, 4, and 5. Microphones may be distributed at the intersections of the rows and columns, and the placement of that microphone described in relation to those headings. For example, microphone A1 is located at an upper-left-most corner while microphone E5 is at a lower-right-most corner.

At 602 the dynamically addressable microphone array 600 is depicted in an inactive state. Inactive microphones 604 are depicted herein with light stippling. Inactive microphones 604 may be inactive from an operational or analytical point of view. For example, operationally inactive microphones may be deactivated such that they are not gathering data. Analytically inactive microphones may gather data, but the data acquired may be disregarded or discarded.

A first dynamic configuration 606 is depicted, in which two microphone arrays have been defined within the dynamically addressable microphone array 600. The first microphone array 104(1) comprises four active microphones at A2, C2, A5, and C5. In these figures, microphones active in the first microphone array 104(1) are denoted with a crosshatch pattern. The second microphone array 104(1) comprises four active microphones at A3, B3, A4, and B4. This configuration effectively forms a variation of the offset nested configuration 504 in which shared microphones are not used.

The array selection module 124 may change the configuration of the arrays within the dynamically addressable microphone array 600. This change may occur in response to localization data generated by the localization module 122, changes in the position of the sound source 314, presence of noise sources within the environment, and so forth.

A second dynamic configuration 608 is depicted, such as may occur when the array selection module 124 determines another configuration is called for. For example, consider where the array 600 encompasses a large room and the sound source 314 such as a user has walked across the room to a location about in the center of the room. The first microphone array 104(1) has been dynamically adjusted to activate microphones A2, A5, D2, and D5. Likewise, the second microphone array 104(2) has been dynamically adjusted to activate microphones D1, E1, E2, and share microphone 302 which is present at location D2 with the first array 104(1). This configuration is a variation of the offset external configuration 506 described above. By using this configuration, or other dynamic configurations of the available microphones, the localization module 122 is able to locate the sound source 314 within the environment.

Figure 7:
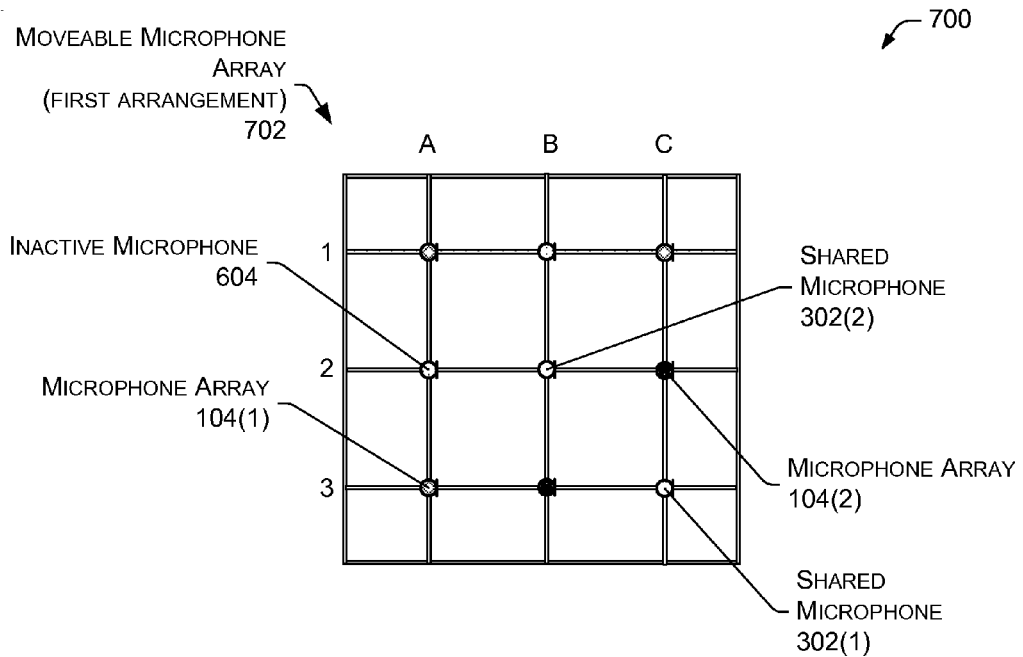
FIG. 7 illustrates a moveable microphone array, configured to displace microphones to different spatial positions to form two or more microphone arrays.
Figure 7:
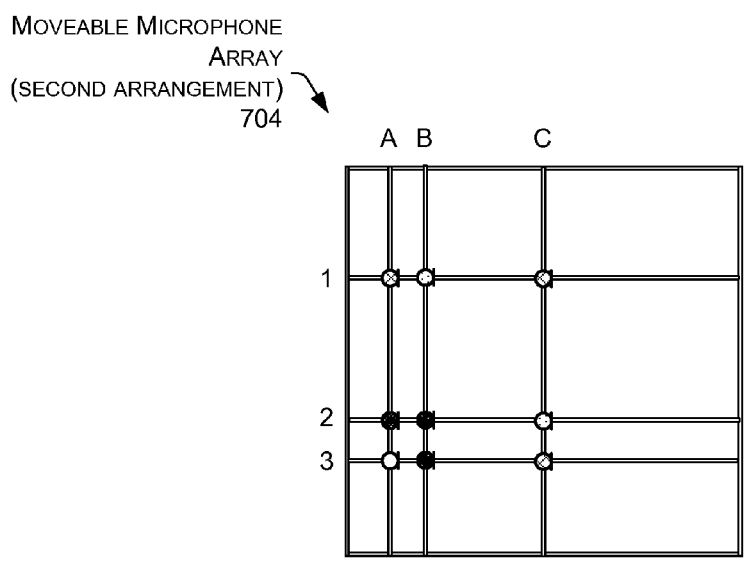
Figure 7:
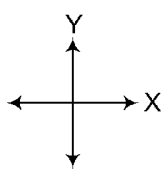

FIG. 7 illustrates a moveable microphone array 700, configured to physically displace at least a portion of the microphones therein to different physical locations. This movement may include movement in one, two, or three dimensions. Movement may be accomplished with electric motors, pneumatic or hydraulic actuators, magnetic fields, and so forth. The movement may be at least partly in response to the localization module 122 or other modules in the system. For example, the localization module 122 may move microphones in the moveable array 700 at least partly in response to the user moving from one position in the room to another, or to try and reduce interference from a noise source such as an operational air conditioning unit.

A first arrangement 702 depicts the moveable microphone array 700 where seven of nine microphones are active at first positions. The general microphone configuration is a variation of an offset nested configuration 504 in which two microphones 302(1) and 302(2) are shared. In this arrangement, the first microphone array 104(1) comprises microphones A1, C1, A3, and shared microphones 302(1) at C3 and 302(2) in a center of the array at B2. The second microphone array 104(2) comprises the shared microphones 302(1) at C3 and 302(2) at B2 as well as microphones at C2 and B3.

At the direction of the localization module 122 or another module in the system, the microphones are physically displaced, resulting in a second arrangement 704 of the moveable microphone array. In this arrangement, the rows and columns have been displaced such that the microphones form a physically smaller first microphone array 104(1) and second microphone array 104(2). The arrangement of which microphones are active has also changed in that C3 is no longer shared. In addition to the physical displacement of the microphones, the second microphone array 104(2) has been shifted from a bottom right of the array 700 to a bottom left of the array. Thus, as shown here, in some implementations the devices and techniques of the dynamically addressable microphone array 600 and the moveable microphone array 700 may be combined.

Illustrative Processes

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 8:
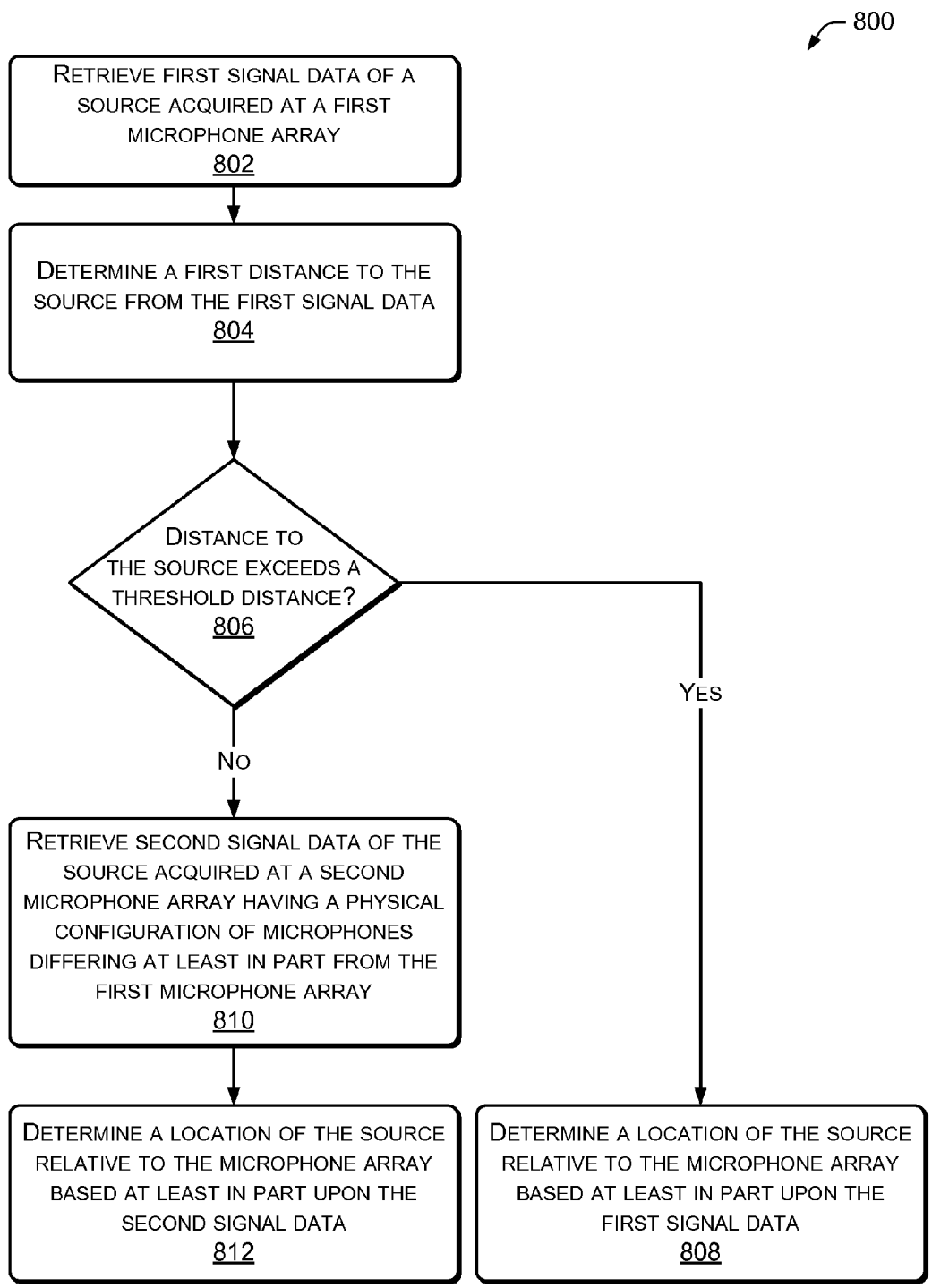
FIG. 8 is an illustrative process of determining a location of a sound source using two microphone arrays.

FIG. 8 is an illustrative process 800 of determining a location of a sound source using two or more microphone arrays. At 802, a first signal data of a signal source acquired at a first microphone array is retrieved. At 804, from the first signal data, a first distance to the signal source relative to a predetermined point is determined. In some implementations a bearing, or a distance and a bearing may be determined.

At 806 a determination is made as to whether the distance exceeds a threshold distance. In some implementations, other thresholds may be used, such as bearing, distance and bearing, and so forth. This threshold may be statically set or determined dynamically. For example, the localization module 122 may be configured to determine a possible location of the signal source using a depth sensor and set the threshold distance based at least in part upon a correspondence of the possible location to the first location or second location. In this way, the system may be calibrated to select the array which generates location data which most accurately reflects the true position of the sound source 314, at least as determined by the depth sensor. In some implementations, the depth sensor may comprise structured light emitted by a projector. This is discussed in more depth below with regards to FIG. 10.

In some implementation, a threshold value using one or more attributes other than distance may be used. These attributes may include a determined spatial location of the sound source, a distance of the sound source from a predetermined point, or a signal-to-noise-ratio of a signal in the data. For example, a sound source in a particular region of a room may use a particular microphone array, regardless of distance.

When at 806 the first distance exceeds the threshold distance, the process proceeds to 808. At 808, a first location of the source based at least in part on the first signal data is determined.

When at 806 the first distance is less than or equal to the threshold distance, the process proceeds to 810. At 810, second signal data of the signal source acquired at a second microphone array is retrieved. This second microphone array comprises a physical configuration of microphones which differs at least in part from the first microphone array. The first microphone array and second microphone array are configured such that they intersect at one or more microphones but are non-identical overall.

At 812, a location of the source relative to the microphone array is determined based at least in part on the second signal data is determined. In some implementations, the first signal data and the second signal data may be acquired at substantially the same time.

Figure 9:
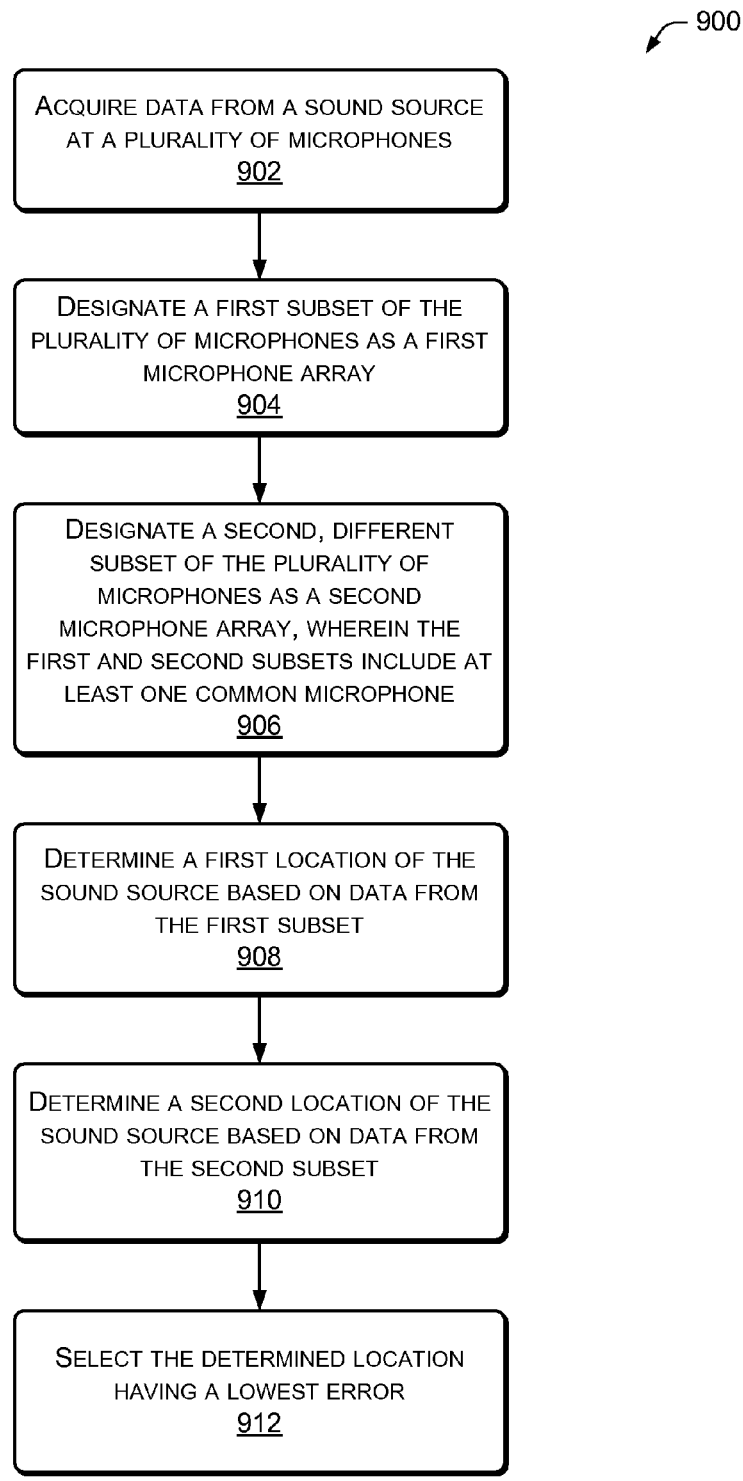
FIG. 9 is an illustrative process of using a dynamically addressable microphone array and selecting two subsets of microphones therein to determine a location of a sound source.

FIG. 9 is an illustrative process 900 of using the dynamically addressable microphone array 600 or the moveable microphone array 700. As described above, the microphones configured to acquire data from the sound source are individually addressable. For example, four or more microphones, or the data therefrom, out of an array of twenty-five may be configured in the first dynamic configuration 606 to form the first microphone array 104(1) as shown in FIG. 6, while other microphones form the second microphone array 104(2). In another implementation, three or more microphones may be used, from which two or more arrays may be configured. For example, microphones may be coupled with direction-selective surfaces, allowing localization of a sound with two microphones. Thus, three microphones may comprise the first and second array, where the first and the second array each comprise two microphones having direction-selective surfaces.

Each microphone array thus comprises a plurality of individual microphones which are a subset of the available microphones. As a result, designated microphone arrays having different physical arrangements, counts of microphones, and so forth may be selected. The data acquired by these two or more subsets of microphones is used to determine a location of a sound source.

At 902, data is acquired from a sound source at a plurality of microphones. For example, the dynamic microphone array 600 or moveable microphone array 700. At 904, a first subset of the plurality of microphones is designated as a first microphone array. For example, the first microphone array 104(1) of the first dynamic configuration 606 of FIG. 6.

At 906, a second, different subset of the plurality of microphones is designated as a second microphone array. The first subset and second subset are configured such that the subsets include at least one common microphone. Stated another way, the first and second subsets intersect with one or more microphones but are non-identical. For example, the second dynamic configuration 608 comprises the first subset of the first microphone array 104(1) and the second subset of the second microphone array 104(2) which intersect at the shared microphone 302.

In some implementations, the first subset of microphones and the second subset of microphones are configured such that the second subset comprises microphones physically disposed in a spatial arrangement encompassing an area less than the first subset. The spatial arrangements and encompassing areas may be immediately adjacent, overlap in some implementations, or may be discrete from one another. Thus, in some implementations at least a portion of the second subset may be disposed within the second subset. For example, the first dynamic configuration 606 of FIG. 6. The first subset and the second subset together may use less than all of the plurality of microphones. Thus, there may be some inactive microphones 604.

At 908, a first location of the sound source is determined based on data from the first subset. For example, the localization module 122 may use a variety of techniques including trilateration, time-difference-of-arrival, and so forth to determine the location. Various time-difference-of-arrival techniques may be utilized. These include the VMRL technique described by Jean-Marc Valin, Francois Michaud, Jean Rouat, Dominic Letourneau as well as the linear intersection estimator also known as the BAS technique by Michael S. Brandstein, John E. Adcock, and Harvey F. Silverman.

At 910, a second location of the sound source is determined based on data from the second subset of the plurality of microphones. At 912, the determined location having a lowest error is selected. The lowest error may be determined based on uncertainty in the acquired data, comparison with other sensor data such as from an imaging system, pre-defined constraints such as known room dimensions, and so forth.

Once selected, the determined location may be used by other modules, such as the augmented reality module 120 to process the sound signal as an input, for tracking, and so forth. In some implementations, the designation of the subsets may occur prior to data acquisition. For example, the subsets may be designated, and data from the microphones in the subsets stored or processed while data from microphones not in the subsets is discarded or not acquired.

Figure 10:
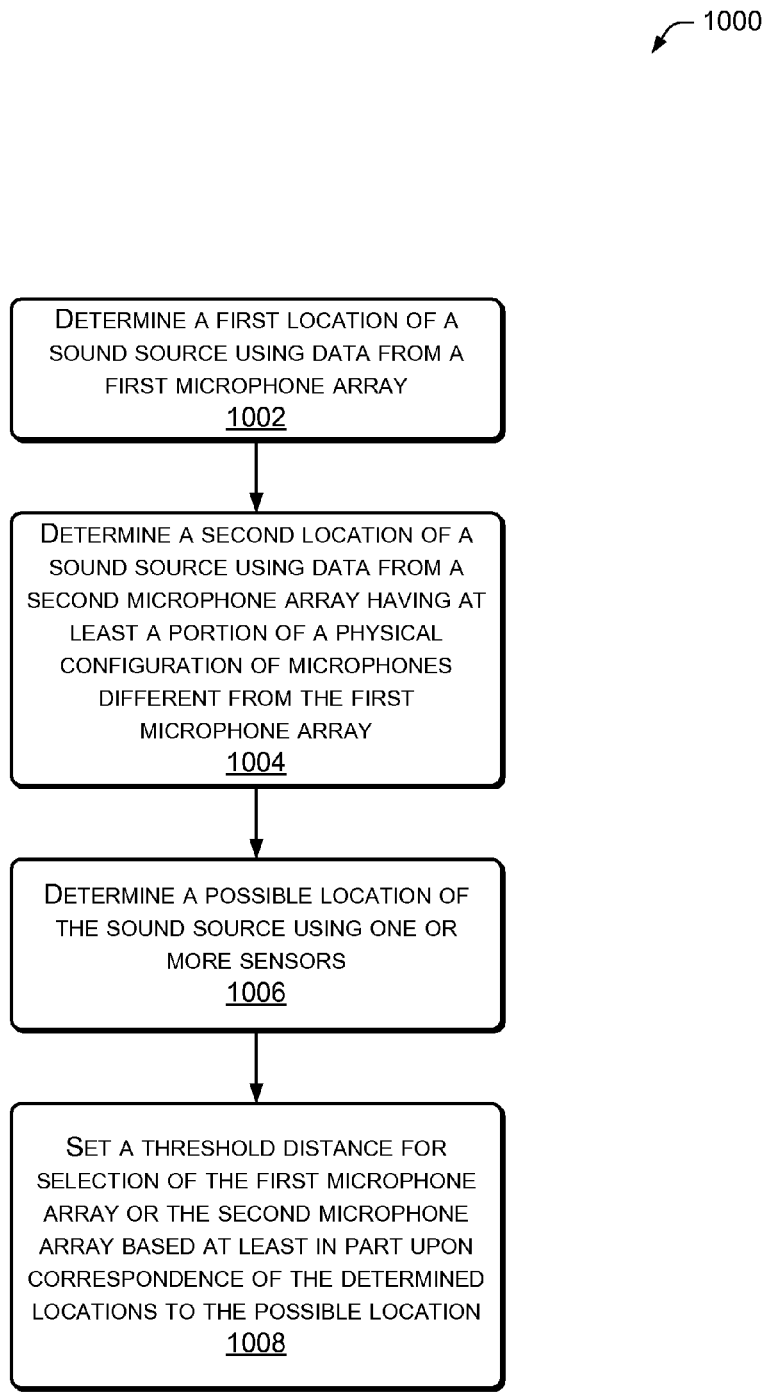
FIG. 10 is an illustrative process of setting a threshold distance for determining which of two or more arrays to use.

FIG. 10 is an illustrative process 1000 of setting a threshold distance for determining which of two or more arrays to use. As described above, the threshold distance 310 may be configured such that one of a plurality of microphone arrays or subsets of microphones provide accurate data for use by the localization module 122 to determine the position of the sound source 314.

At 1002, a first location of a sound source using data from a first microphone array is determined. At 1004, a second location of a sound source is determined using data from a second microphone array having at least a portion of a physical configuration of microphones different from the first microphone array.

At 1006, a possible location of the sound source is determined using one or more sensors other than the microphones. For example, images acquired by the camera 210 within the ARFN 102 chassis 204 may be used in conjunction with position information from the pan motor 214, tilt motor 216, and roll motor 218 to provide a possible location. In another example, a LIDAR scanner may locate the user's face in the room which may be designated as a sound source for speech.

At 1008, a threshold distance for selection of the first microphone array or the second microphone array is set based at least in part upon correspondence of the first and second locations to the possible location. For example, consider where the first location is (203, 127, 51), the second location is (191, 135, 70), and the possible location is (196, 125, 53). The first location is closest to the possible location, and thus is deemed to correspond most closely to the possible location. This correspondence may be based on a magnitude of a distance vector, error analysis, and so forth.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
one or more processors;
a first microphone array comprising a first plurality of microphones in a first arrangement, the first plurality of microphones being coupled to the one or more processors and configured to generate first signal data from a sound source;
a second microphone array comprising a second plurality of microphones in a second arrangement, the second plurality of microphones being coupled to the one or more processors and configured to generate second signal data from the sound source;
a localization module executable by the one or more processors to:
determine a first spatial location of the sound source based at least in part on the first signal data, the first spatial location of the sound source being calculated as a distance from an origin; and based at least in part on a determination that the distance from the origin is below a threshold value, determine a second spatial location of the sound source based at least in part on the second signal data.

2. The system of claim 1, wherein the first arrangement encompasses an area greater than the second arrangement.

3. The system of claim 1, further comprising additional microphone arrays, the additional microphone arrays disposed such that one or more additional microphone arrays of the additional microphone arrays are at least one of disposed within at least a portion of the first microphone array, disposed within at least a portion of the second microphone array, or disposed within at least a portion of the first microphone array and the second microphone array.

4. The system of claim 1, wherein at least a portion of the first microphone array encompasses at least a portion of the second microphone array.

5. The system of claim 1, wherein the second microphone array is disposed at least partially within the first microphone array and at least partially outside of the first microphone array.

6. The system of claim 1, wherein at least one microphone is shared between the first microphone array and the second microphone array.

7. The system of claim 1, wherein the spatial location is determined based at least in part on a time difference of arrival between two microphones, and wherein each of the two microphones belong to one or more of the first plurality of microphones or the second plurality of microphones.

8. The system of claim 1, wherein the first plurality of microphones, the second plurality of microphones, or both are disposed equidistant from one another around a perimeter of a symmetric quadrilateral shape.

9. The system of claim 8, wherein the first plurality of microphones, the second plurality of microphone, or both are disposed in a single plane.

10. A system comprising:
three or more microphones configured such that each microphone is individually addressable and configured to acquire data from a sound source; and
an array selection module configured to access the data acquired by a first subset of the three or more microphones and a second, different subset of the three or more microphones; and
a localization module coupled to one or more processors and configured to:
determine a spatial location of the sound source based at least in part on the data from the first subset of microphones; and
based at least in part on a determination that one or more attributes of the sound source are below a threshold value, determine the spatial location of the sound source based at least in part on the data from the second subset of microphones.

11. The system of claim 10, wherein at least a portion of the second subset is disposed within the first subset.

12. The system of claim 10, wherein at least one microphone of the three or more microphones is excluded from both the first subset and the second subset.

13. The system of claim 10, wherein each of the three or more microphones is configured to have substantially a same response characteristics.

14. The system of claim 10, wherein at least a portion of the three or more microphones are configured to move from one location to another location.

15. The system of claim 10, wherein the first subset, the second subset, or both comprise the three or more microphones disposed equidistant from one another around a perimeter of a symmetric quadrilateral shape.

16. The system of claim 10, wherein the three or more microphones are disposed in a single plane.

17. The system of claim 10, wherein at least one microphone is shared between the first subset and the second subset.

18. The system of claim 10, wherein the one or more attributes comprise at least one of a determined spatial location of the sound source, a distance of the sound source from a pre-determined point, or a signal-to-noise-ratio of a signal in the data.

19. The system of claim 10, wherein the spatial location is determined based at least in part on a time difference of arrival between two or more of the three or more microphones.

20. One or more non-transitory computer-readable media storing computer-executable instructions that, when executed, cause one or more processors to perform acts comprising:
retrieving first signal data of a signal source acquired at a first microphone array;
determining, from the first signal data, a first distance to the signal source relative to a pre-determined point;
based at least in part on a determination that the first distance exceeds a threshold distance, determining a first location of the source based at least in part on the first signal data; and
based at least in part on a determination that the first distance is less than the threshold distance:
retrieving second signal data of the signal source acquired at a second microphone array; and
determining, from the second signal data, a second location of the signal source based at least in part on the second signal data.

21. The one or more non-transitory computer-readable storage media of claim 20, wherein the first signal data and the second signal data are acquired at substantially a same time.

22. The one or more non-transitory computer-readable storage media of claim 20, the acts further comprising determining the threshold distance at least partly by:
determining a candidate location of the signal source using a depth sensor; and
setting the threshold distance based at least in part upon a correspondence of the candidate location to the first location or second location.

23. The one or more non-transitory computer-readable storage media of claim 22, wherein the depth sensor comprises a projector configure to project structured light.

24. The system of claim 10, wherein the second subset comprises microphones physically disposed in a spatial arrangement encompassing an area that is less than an area defined by a spatial arrangement of the first subset.

* * * * *